United States Patent
Irikura et al.

(10) Patent No.: US 6,536,212 B1
(45) Date of Patent: Mar. 25, 2003

(54) OPERATION MECHANISM OF A VARIABLE DISPLACEMENT HYDRAULIC PUMP

(75) Inventors: Koji Irikura, Morristown, TN (US); Mike Chisman, Morristown, TN (US)

(73) Assignee: Tuff Torq Corporation, Morristown, TN (US)

( * ) Notice: Subject to any disclaimer, the term of this patent is extended or adjusted under 35 U.S.C. 154(b) by 0 days.

(21) Appl. No.: 09/901,656

(22) Filed: Jul. 11, 2001

(51) Int. Cl.⁷ .............................................. F16D 31/02
(52) U.S. Cl. .................................... 60/469; 60/487
(58) Field of Search ................ 60/469, 487; 92/12.1, 92/13.8

(56) References Cited

U.S. PATENT DOCUMENTS

| | | | | |
|---|---|---|---|---|
| 4,087,970 A | * | 5/1978 | Slazas et al. .................. | 60/487 |
| 4,912,999 A | * | 4/1990 | Franks et al. ............. | 74/417 X |
| 6,073,443 A | * | 6/2000 | Okada et al. ................. | 60/456 |
| 6,199,380 B1 | * | 3/2001 | Ishii ............................ | 60/485 |

FOREIGN PATENT DOCUMENTS

| | | |
|---|---|---|
| JP | 3-69755 | 7/1991 |
| JP | 5-302673 | 11/1993 |
| JP | 6-12318 | 3/1994 |
| JP | 7-16138 | 4/1995 |

* cited by examiner

*Primary Examiner*—Edward K. Look
*Assistant Examiner*—Michael Leslie
(74) *Attorney, Agent, or Firm*—Sterne, Kessler, Goldstein & Fox P.L.L.C.

(57) ABSTRACT

An operation mechanism for a variable displacement hydraulic pump. The hydraulic pump is disposed in a housing filled with first fluid. A capacity regulating member is provided on the hydraulic pump in the housing for changing the discharge amount of the hydraulic pump. An operation member is operationally connected to the capacity regulating member. The operation member is to be manipulated outside the housing. A resistive device is interposed between the operation member and the capacity regulating member for making the motion of the capacity regulating member slow. The resistive device is an assembly unit comprising a casing, a piston slidably disposed in the casing, and second fluid sealed in the casing. The second fluid is different from the first fluid. The casing is fitted into the hole provided in the housing. The retaining member retains the casing in the hole.

18 Claims, 11 Drawing Sheets

OPERATION MECHANISM OF A VARIABLE DISPLACEMENT HYDRAULIC PUMP

BACKGROUND OF THE INVENTION

1. Field of the Invention

The present invention relates to an operation mechanism of a variable displacement hydraulic pump in a hydrostatic transmission (hereinafter referred to as an "HST") adapted as a shift transmission for a vehicle, wherein the operation mechanism is attempted to reduce a shock in shifting the vehicle effectively, to have a good reliability in its motion and to ease its assembling and maintenance.

2. Background Art

As is well-known, there is a conventional HST comprising a hydraulic pump and a hydraulic motor fluidly connected with each other, wherein at least the hydraulic pump is volumetrically variable so that the capacity of the hydraulic pump is varied for changing the traveling speed of a vehicle. The hydraulic pump is provided with a capacity regulating member, e.g., a movable swash plate, operatively connected with a speed control device like a lever or a pedal on a vehicle. The capacity regulating member is operated in correspondence to the operational degree of the speed control device so as to change the traveling speed of the vehicle.

Furthermore, conventionally, there are various well-known means to moderate the operation of the capacity regulating member for avoiding sudden shock in shifting as follows:

Japanese Utility Model Laid Open Gazette No. Hei 3-69,755 discloses a damper provided in an HST housing, wherein a rod of the damper is pivotally connected to a speed control arm for operating the capacity regulating member. Lubrication oil filled in the housing is introduced into the damper. In the damper, the flow of lubrication oil is limited by an orifice or the like. Thus, the damper serves as a fluid-resistive device which uses lubrication oil.

Japanese Utility Model No. Hei 7-16,138 discloses a gas damper replacing the above-mentioned damper, wherein the gas damper using air or the like is disposed in the HST housing, however, out of communication with lubrication oil in the housing.

Japanese Utility Model No. Hei 6-12,318 discloses a damper serving as a fluid-resistive device using HST-operation oil.

However, since the fluid-resistance generated by the damper which uses lubrication oil or HST-operation oil in an HST housing is small, the moderation of the capacity regulating member in motion may be insufficient. On the other hand, the orifice in the damper, if narrowed to increase the fluid-resistance, tends to be choked with dust, thereby preventing the damper from secure action. Furthermore, it must be considered that the viscosity of lubrication oil or HST-operation oil varies so as to change the effect of the damper because the temperature of lubrication oil or HST-operation oil is increased according to operation of the HST.

The gas damper is also desired to be improved because of its small resistance and its large elasticity which causes uncertainty in its damping effect.

Furthermore, the above-mentioned conventional dampers cannot be assembled easily, thereby increasing the number of processes and labor for producing the HST.

BRIEF SUMMARY OF THE INVENTION

An object of the present invention is to provide an operation mechanism which operates a capacity regulating member of a variable displacement hydraulic pump disposed in a housing, wherein the capacity regulating member receives sufficient resistance so as to be moderated in its motion, and the capacity regulating member and the operation mechanism are finally assembled together.

To achieve the object, according to the present invention, the operation mechanism comprises an operating device and a resistive device. The operating device is operationally connected with the capacity regulating member. The operating device receives an operational force from the outside of the housing so as to operate the capacity regulating member. The resistive device is operationally connected with the capacity regulating member so as to give a resistant force onto the capacity regulating member in motion.

The resistive device comprises a casing, a piston slidably disposed in the casing, and fluid hermetically filled in the casing, which is different from fluid filled in the above-mentioned housing for lubrication or operating the hydraulic pump. These component elements are previously assembled or composed together so as to serve as the unified resistive device. The housing is provided therein with a hole, in which the casing of the resistive device is immovably caught with a retainer disposed in the hole. The resistive device as an assembly unit is entirely removable, thereby facilitating its maintenance.

The hole is formed by a center section disposed in the housing. Therefore, the space for arranging the center section is also utilized to arrange the resistive device, thereby contributing to minimization of the device.

Alternatively, the hole may be formed by a wall of the housing so that the resistive device can be easily arranged at a suitable position where it can be actuated without being inhibited by other parts.

The hole may be defined in the housing. Therefore, the resistive device is not exposed outside the housing, thereby being protected from rust and reducing expenses.

The resistive device may be structured by slidably inserting the piston and hermetically filling the fluid into such a hole formed by the wall of the housing or the center section without the casing, thereby reducing the number of component parts.

The fluid of the resistive device which is hermetically filled in the hole or the casing is more viscous than that filled in the housing for lubrication and hydraulic operation of the hydraulic pump. Therefore, sufficient fluid-resistance can be obtained while a restrictive fluid passage, e.g., an orifice, in the resistive device is not greatly narrowed, thereby securing a sufficient sectional area of the restrictive fluid passage so as not to be choked with dust. Consequently, the resistive device can be secured in its actuation and minimized.

Alternatively, the fluid of the resistive device may be less viscous than that filled in the housing for lubrication or operation for the hydraulic pump. Generally, fluid having a little viscosity is less variable in its viscosity than that having a great viscosity regardless of the variation of temperature. Thus, the resistive device is secured in its actuation for moderating the capacity regulating member while the surrounding temperature is increased by operation of the hydraulic pump.

Alternatively or additionally, a resistive device for applying a resistance onto the capacity regulating member of the hydraulic pump in motion may be constituted by a spring provided in a linkage between the operation device and the capacity regulating member.

If this spring-resistive device is provided in addition to the above-mentioned fluid-resistive device, the spring-resistive device may be interposed between the fluid-resistive device and the operating device. Consequently, the capacity regulating member of the hydraulic pump can be more properly actuated by the synergetic effect of the fluid-resistive device and the spring-resistive device.

The spring-resistive device increases its biasing force for the operating device toward its initial position as the operational degree of the operating device is increased. Also, the biasing force is acceleratedly increased when the operational degree of the operating device exceeds a certain value. Therefore, when the operational degree of the operating device is small, the motion of the capacity regulating member is relatively effected by the fluid-resistive device so as to effectively reduce the shock of a vehicle in starting. When the operational degree of the operating device is large, the capacity regulating member is effected by the biasing force of the spring-resistive device rather than the fluid-resistance of the fluid-resistive device, thereby enhancing its response to the operation of the operating device.

Such a spring-resistive device whose biasing force is changed as mentioned above may be constructed simply at low costs as follows:

The spring-resistive device comprises double coiled springs which are a pair of diametrically larger and smaller springs. The free-displacing length of one of the springs is larger than that of the other spring.

These, other and further objects, features and advantages or the invention will appear more fully from the following description taken in connection with the accompanying drawings.

BRIEF DESCRIPTION OF THE DRAWINGS/ FIGURES

DETAILED DESCRIPTION OF THE INVENTION

Figure 1:
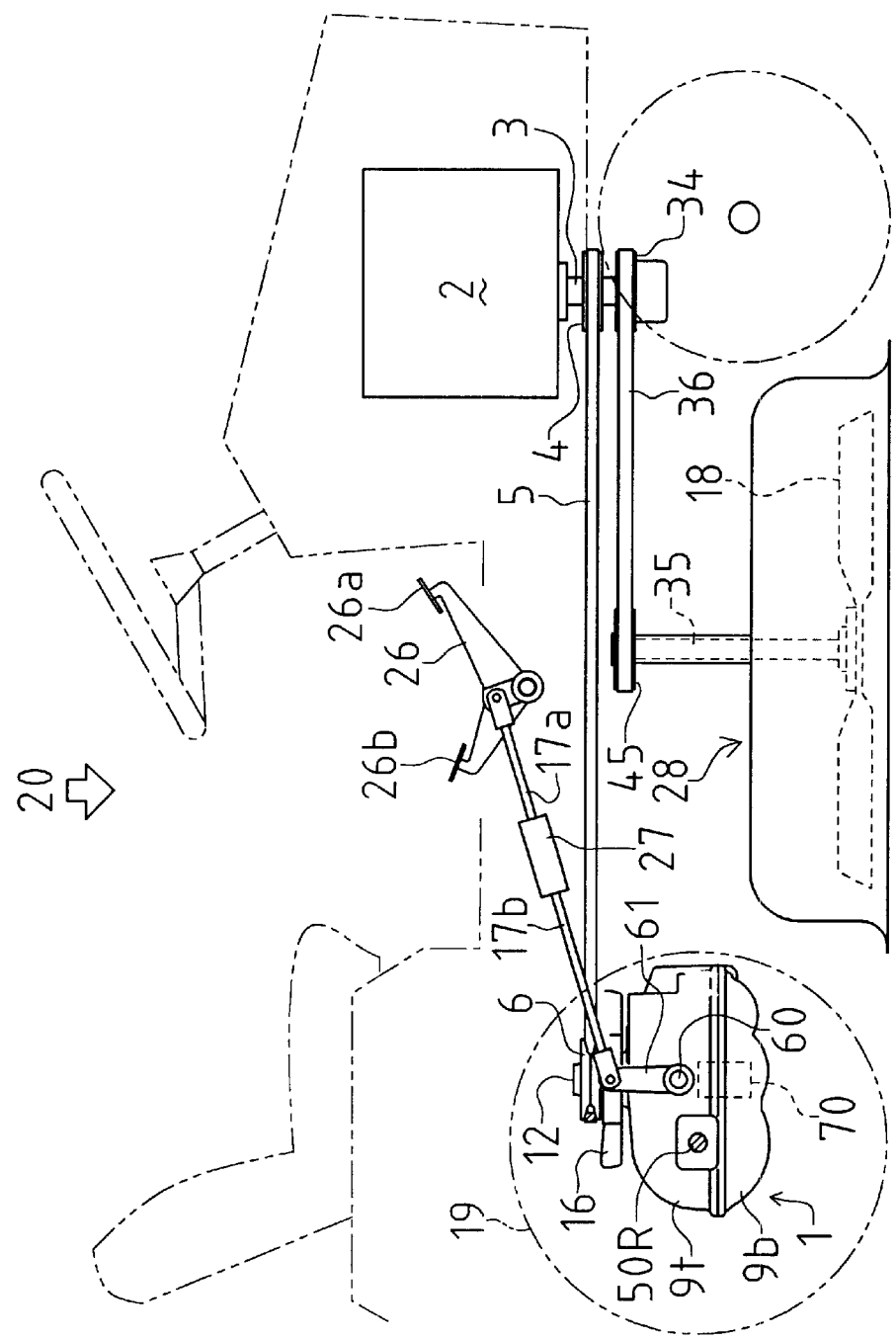
FIG. 1 is an entire side view of a mower tractor having an operation mechanism of a variable displacement hydraulic pump according to the present invention.

Description will be given of an entire structure of a mower tractor 20 employing an operation mechanism of the present invention in accordance with FIG. 1. Mower tractor 20 is of a mid-mount mower type which is provided at its midbottom portion with a mower 28. An engine 2 is supported on a front portion of the vehicle. An output shaft 3 of engine 2 is extended vertically downward and provided thereon with a pair of output pulleys 4 and 34.

An axle driving apparatus 1 is disposed at a rear portion of mower tractor 20. Axle driving apparatus 1 comprises a housing 9 as upper and lower housing parts 9t and 9b joined with each other, and a pair of left and right rear axles 50L and 50R supported by housing 9. Rear drive wheels 19 are fixed onto outer ends of respective rear axles 50L and 50R. Axle driving apparatus 1 comprises a vertical input shaft 12, which projects upwardly from upper housing part 9t of housing 9 and is fixedly provided thereon with an input pulley 6. A belt 5 is interposed between output pulley 4 and input pulley 6 so as to drivingly connect input shaft 12 to output shaft 3 of engine 2.

As mentioned above, mower 28 having rotary blades 18 is disposed at the mid-bottom portion of mower tractor 20. Mower 28 is provided with a drive shaft 35. An input pulley 45 is fixed onto a top end of drive shaft 35. A belt 36 is interposed between output pulley 34 and input pulley 45. Output pulley 34 is provided with an electromagnetic clutch, which is engaged to transfer power to rotary blades 18 in mower 28 and disengaged to shut down the power from rotary blades 18.

A speed change pedal unit 26 as a speed control operation device is disposed on a footboard (not shown) of mower tractor 20. Speed change pedal unit 26 has a pair of front and rear speed change pedals 26a and 26b to be depressed. When front speed change pedal 26a is depressed, mower tractor 20 travels forward. When rear speed change pedal 26b is depressed, mower tractor 20 travels backward. Furthermore, the forward and backward traveling speed of mower tractor 20 is increased in proportion to the degree of depressing respective pedals 26a and 26b. Speed change pedal unit 26 is connected to a later-discussed control lever 61 provided on a side surface of housing 9 of axle driving apparatus 1 through a linkage comprising a front connection rods 17a, a rear connection rod 17b and a spring joint 27 interposed between connection rods 17a and 17b.

An operation device for speed changing is not limited to speed change pedal unit 26 of this embodiment. For example, it may alternatively be constituted by a lever.

Figure 4:
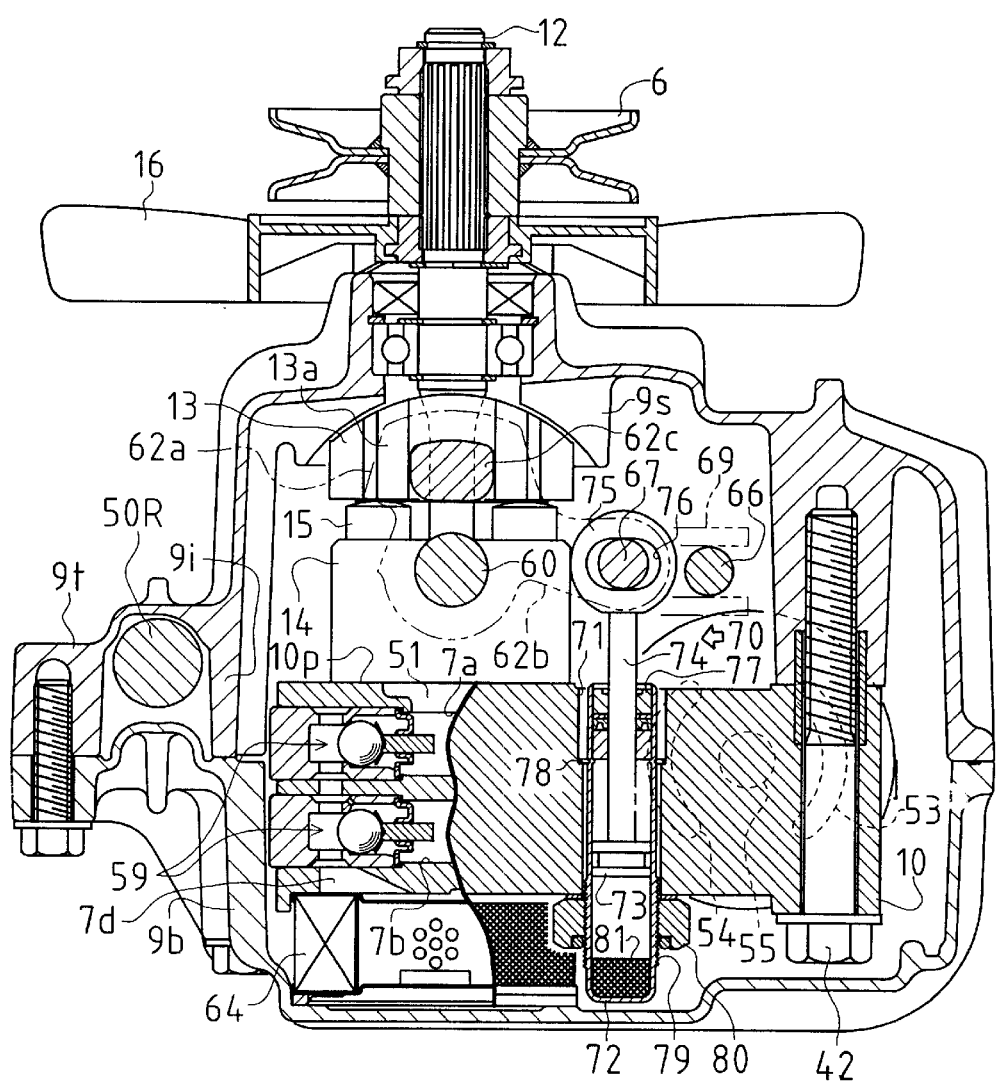
FIG. 4 is a cross sectional view taken on line A—A of FIG. 2 showing an internal damper according to a first embodiment of the present invention.

Description will now be given of axle driving apparatus 1. Housing 9 of axle driving apparatus 1 is formed by joining upper housing part 9t and lower housing part 9b with each other through their horizontal surrounding joint surfaces. As shown in FIG. 2 and 4, a bearing portion for a later-discussed motor shaft 22 is formed between the joint surfaces of upper and lower housing parts 9t and 9b. As shown in FIGS. 1,2 and 4, bearings for journalling rear axles 50L and 50R are formed by upper housing part 9t above its joint surface. As shown in FIG. 2, both rear axles 50L and 50R are differentially connected at their distal ends with each other through a differential unit 40 in housing 9. Rear axles 50L and 50R project outwardly from left and right outer ends of housing 9 so as to be fixedly provided on their outer ends with rear wheels 19.

As shown in FIG. 2, housing 9 is integrally formed therein with an inner wall 9i which divides an internal space of housing 9 into a first chamber R1 and a second chamber R2. In first chamber R1 is disposed a hydrostatic transmission (hereinafter referred to as "HST") 8. In second chamber R2 are disposed a drive train 30 as a gear train for transferring power from motor shaft 22 to differential unit 40, differential unit 40 and rear axles 50L and 50R.

As shown in FIG. 2, inner wall 9i comprises a lateral portion parallel to rear axles 50L and 50R and a longitudinal portion perpendicular to rear axles 50L and 50R arranged in series so that first chamber R1 and second chamber R2 are juxtaposed before and behind through the lateral portion of inner wall 9i, and juxtaposed left and right through the longitudinal portion of inner wall 9i. First and second chambers R1 and R2 are filled with common lubrication oil so as to form respective oil sumps.

More specified, as shown in FIG. 2, in housing 9 is formed first chamber R1 in front of one axle 50R and laterally adjacent to drive train 30 interposed between motor shaft 22 and differential unit 40.

In first chamber R1 is disposed a center section 10 of HST 8 removably fastened to housing 9 with a bolt 42, as shown in FIG. 4. Center section 10 is elongated and arranged so that its longitudinal direction is oriented perpendicularly to rear axles 50L and 50R. Center section 10 is formed at its front half portion with a vertical surface serving as a motor mounting surface 10m onto which a hydraulic motor 21 is mounted. Center section 10 is formed at its rear half portion with a horizontal surface serving as a pump mounting surface 10p onto which a variable displacement hydraulic pump 11 is mounted. Above-mentioned input shaft 12 serving as a pump shaft is vertically inserted into center section 10 through a center of pump mounting surface 10p and rotatably supported.

Hydraulic pump 11 will be described in accordance with FIGS. 2 to 4. A cylinder block 14 is slidably rotatably mounted on pump mounting surface 10p through a valve plate. Cylinder block 14 is formed therein with a plurality of cylinder holes in parallel to its rotational axis. Pistons 15 are reciprocally inserted into the respective cylinder holes through biasing springs. Heads of pistons 15 abut against a movable swash plate 13 serving as a capacity regulating member for hydraulic pump 11.

Pump shaft 12 is not-relatively rotatably fitted through cylinder block 14, thereby serving as a rotational axis of cylinder block 14. The top end portion of pump shaft 12 projects upwardly from the top wall of upper housing part 9t and fixedly provided thereon with input pulley 6 and a cooling fan 16, as shown in FIGS. 1 and 3. As mentioned above, the rotational force of output shaft 3 of engine 2 is transferred into input pulley 6 through output pulley 4 and belt 5.

In this structure, by depressing either pedals 26a or 26b of speed change pedal unit 26, movable swash plate 13 is shifted slantwise at an optional degree from a position where its surface abutting against pistons 15 is perpendicular to the rotational axis of cylinder block 14, i.e., the surface is horizontal, thereby changing the amount and direction of oil discharged from hydraulic pump 11.

A closed hydraulic oil circuit formed in center section 10 will now be described. As shown in FIGS. 3 and 4, center section 10 is bored therein with a pair of upper and lower oil passages 7a and 7b extended longitudinally in parallel with each other. A pair of kidney ports 51 and 52 are open at pump mounting surface 10p. A pair of kidney ports 53 and 54 are open at motor mounting surface 10m. Kidney ports 51 and 53 communicate with each other through upper oil passage 7a. Kidney port 52 is communicated to kidney port 54 through a slant oil passage 7c formed in center section 10 and lower oil passage 7b.

As shown in FIG. 4, a oil supplying passage 7d is vertically formed in center section 10 so as to cross oil passages 7a and 7b in the vicinity of ends of oil passages 7a and 7b. A pair of check valves 59 are disposed at the respective crossing points between oil supplying passage 7d and oil passage 7a, and between oil supplying passage 7d and oil passage 7b. Check valves 59 are opened only when oil is supplied into respective oil passages 7a and 7b. Oil supplying passage 7d is downwardly open at the bottom surface of center section 10. A cylindrical oil filter 64 is disposed below center section 10 so as to cover the downward opening of oil supplying passage 7d.

In this structure, hydraulic oil in housing 9 is introduced into oil supplying passage 7d through oil filter 64 and absorbed into either oil passage 7a or 7b in depression through corresponding one of upper and lower check valves 59, thereby compensating for the reduction of hydraulic pressure of HST 8 caused by the internal oil leak of HST 8.

As shown in FIG. 4, movable swash plate 13 is of a trunnion type. A back surface of movable swash plate 13 is formed into a convex arcuate slide surface, which is slidably fitted on a recessed arcuate supporting surface 9s formed at a ceiling wall of upper housing part 9t, thereby making swash plate 13 slidable along supporting surface 9s of housing 9.

Figure 2:
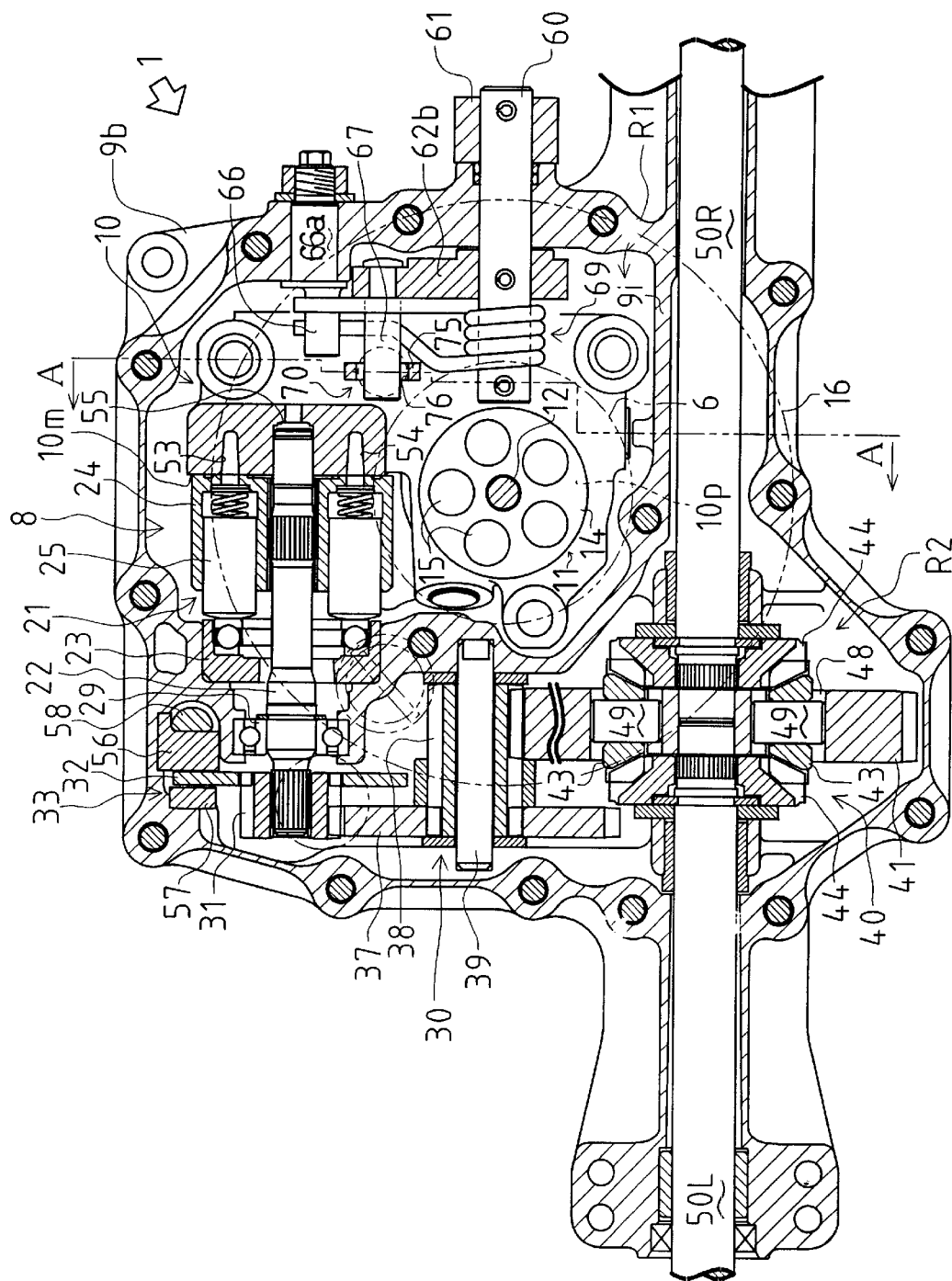
FIG. 2 is a sectional plan view of an axle driving apparatus provided on the mower tractor.
Figure 5:
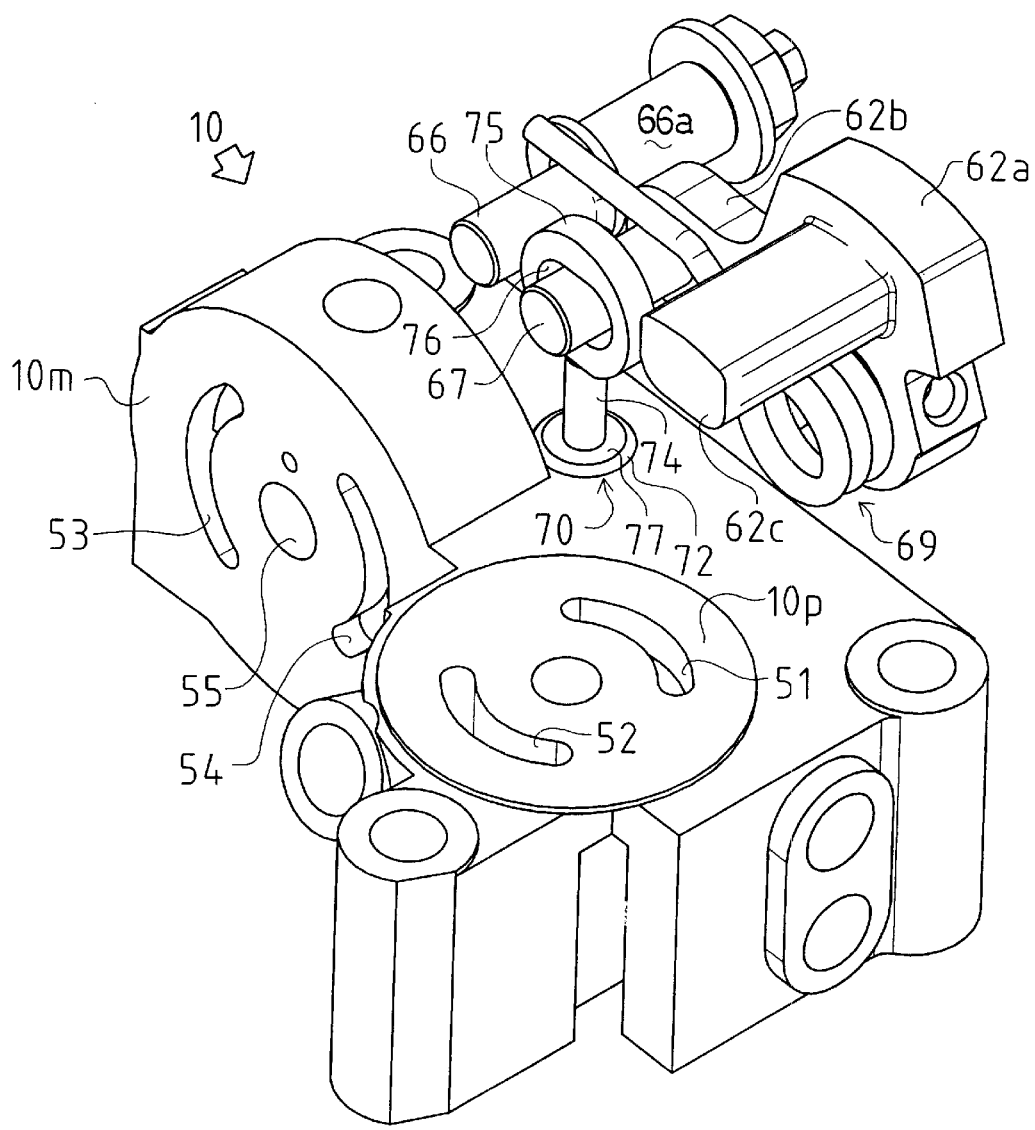
FIG. 5 is a perspective view of a center section 10 showing the inner damper and a connection arm of the first embodiment.

As shown in FIGS. 1, 2 and 4, a speed control shaft 60 is journalled by a side wall of upper housing part 9t. As shown in FIGS. 2, 3 and 5, a connection arm member 62 is provided on an end portion of speed control shaft 60 in housing 9. Connection arm member 62 comprises a boss portion fixed around speed control shaft 60, a first arm 62a extended upwardly from the boss portion, and a second arm 62b extended forwardly from the boss portion.

Figure 3:
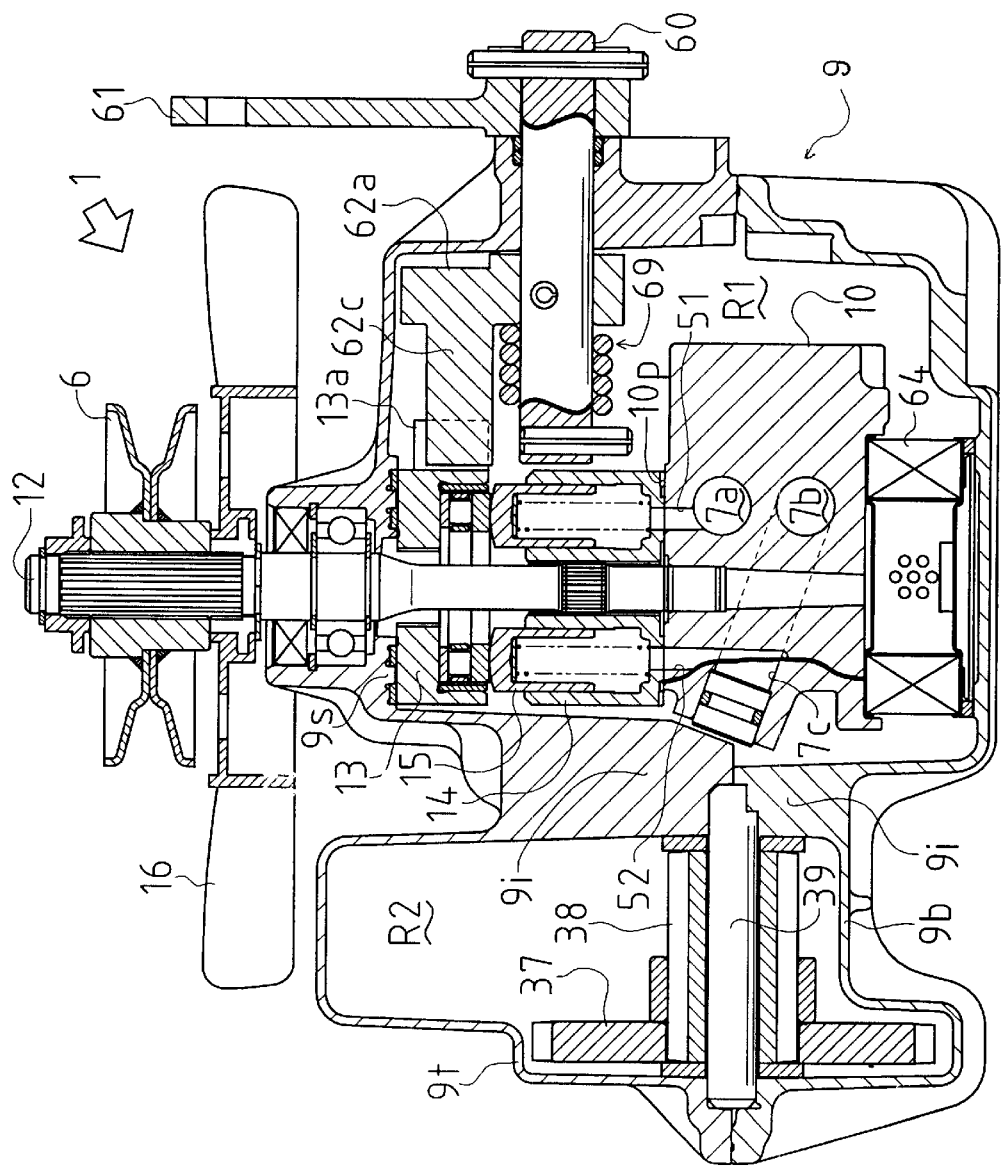
FIG. 3 is a sectional rear view of the same.

As shown in FIG. 3, an engaging segment 62c is extended from an utmost end of first arm 62a in parallel to speed control shaft 60. An utmost end of engaging segment 62c is engagingly inserted into an engaging portion 13a of movable swash plate 13. On the other hand, a speed control lever 61 is fixed onto speed control shaft 60 outside housing 9. As shown in FIG. 1, speed control lever 61 is connected through the above-mentioned linkage to speed change pedal unit 26 disposed before an operator's seat on the vehicle.

Due to this structure, by depressing either pedal 26a or 26b of speed change pedal unit 26, speed control lever 61 is rotated in the longitudinal direction of the vehicle so as to rotate movable swash plate 13 around the axis of speed control shaft 60, thereby changing the capacity of hydraulic pump 11 as mentioned above.

A engaging pin 67 projects from an utmost end portion of second arm 62b. In housing 9, a twisted coil spring serving as a neutral returning spring 69 is wound around speed control shaft 60. Both end portions of neutral returning spring 69 are twisted so as to cross each other and extended toward second arm 62b. An eccentric shaft 66 projects inwardly from a side wall of upper housing part 9t. Engaging pin 67 and eccentric shaft 66 are sandwiched between the extended end portions of neutral returning spring 69.

Engaging pin 67 is connected to a later-discussed internal damper device 70 so as to apply a resistance force onto movable swash plate 13 against a sudden operational force, thereby moderating the motion of movable swash plate 13.

In the above mentioned structure, by depressing either pedal 26a or 26b of speed change pedal unit 26, speed control lever 61 is rotated. At this time, one end portion of neutral returning spring 69 is pushed by engaging pin 67 away from the other end portion which is retained by eccentric shaft 66, thereby applying a biasing force onto speed control lever 61 for returning to its neutral position.

Therefore, when speed control lever 61 is released from the operational force, neutral returning spring 69 returns so as to return engaging pin 67 to its neutral position which is defined by eccentric shaft 66.

Eccentric shaft 66 is integrally provided with a center shaft portion 66a journalled by the side wall of housing 9. Center shaft portion 66a is formed into an adjusting screw, projects outwardly from housing 9 and is provided therearound with a nut. Center shaft portion 66a is rotated and fastened to housing 9 with the nut so that eccentric shaft 66 is revolved around center shaft portion 66a, thereby adjusting the neutral position of movable swash plate 13.

Hydraulic motor 21 will now be described. A cylinder block 24 is arranged so as to orient its rotational axis laterally in parallel to axles 50L and 50R and slidably rotatably mounted onto vertical motor mounting surface 10m of center section 10 through a valve plate. Cylinder block 24 is bored with a plurality of cylinder holes in parallel to its rotational axis. A plurality of pistons 25 are reciprocally inserted into the respective cylinder holes through respective biasing springs.

A fixed swash plate 23 is fixedly sandwiched between upper and lower housing parts 9t and 9b. Heads of pistons 25 abut against fixed swash plate 23. Motor shaft 22 is disposed laterally in parallel to rear axles 50L and 50R and not-relatively fitted through cylinder block 24 on the rotational axis thereof.

One end of motor shaft 22 is rotatably inserted into a bearing hole 55 which is formed in center section 10 and open at the center of motor mounting surface 10m. A bearing 29 is sandwiched between upper and lower housing parts 9t and 9b in inner wall 9i. Motor shaft 22 is extended through swash plate 23, journalled by bearing 29, and projects at the other end thereof into second chamber R2. Bearing 29 is provided with a seal for preventing oil from flowing between chambers R1 and R2 through bearing 29.

Drive train 30 for transferring power from motor shaft 22 to differential unit 40 will now be described. As shown in FIG. 2, in second chamber R2, an output gear 31 is fixed on motor shaft 22. A reduction shaft 39 is rotatably disposed in parallel behind motor shaft 22. Reduction shaft 39 is notched on its outer periphery so as to form a wide diametrically small gear 38. A diametrically large gear 37 is provided on its inner periphery with gear-teeth corresponding to teeth of diametrically small gear 38 so that diametrically large gear 37 is not-relatively rotatably but slidably provided around diametrically small gear 38. Diametrically large gear 37 engages with output gear 31 on motor shaft 22. Diametrically small gear 41 engages with an input gear 41 of differential unit 40.

As shown in FIG. 2, a brake disk 32 is not-relatively rotatably but slidably provided around output gear 31. Brake disk 32 is disposed between braking members 56 and 57, thereby constituting a brake device 33 which brakes motor shaft 22. A vertical brake shaft 58 is rotatably disposed adjacent to braking member 56. Brake shaft 58 is notched at its vertically intermediate portion so as to form a cam portion which is D-like shaped in a sectional plan view. The cam portion of brake shaft 58 is disposed adjacent to a back surface of braking member 56. Brake shaft 58 projects upwardly from housing 9 so as to be linked with a brake pedal (not shown). By depressing the brake pedal, brake shaft 58 is rotated so that braking member 56 is pushed by the cam portion of brake shaft 58 and brake disk 32 is sandwiched and pressed between braking members 56 and 57, thereby applying a frictional braking force onto motor shaft 22.

Differential unit 40 will now be described in accordance with FIG. 2. Differential side gears 44 which are bevel gears are not-relatively rotatably provided on the distal end portions of respective coaxial rear axles 50L and 50R. Rear axles 50L and 50R are further extended from respective differential side gears 44 toward each other. Both the distal ends of rear axles 50L and 50R are slidably rotatably inserted into a central axial hole of input gear 41. Input gear 41 engages with diametrically small gear 38 on reduction shaft 39 so as to receive the output power of HST 8 through drive train 30. As shown in FIG. 2, input gear 41 is formed with a pair of through holes 48 into which bevel pinions 43 and pinion shafts 49 are disposed respectively.

Through holes 48 are disposed in input shaft 41 so as to have 180 degrees of difference in phase from each other. Pinion shafts 49 are disposed in respective through holes 48 and rotatably provided thereon with respective bevel pinions 43. Each of bevel pinions 43 engages with both differential side gears 44.

Due to this structure, the rotational force of motor shaft 22 as the output power of HST 8 is reduced in its speed through drive train 30 and distributed in its torque between left and right rear axles 50L and 50R through differential unit 40.

Description will now be given of an internal damper device 70 for moderating movable swash plate 13 while being suddenly operated. FIG. 4 shows a first embodiment of internal damper device 70. A vertical hole 71 is formed through a side portion of center section 10. In hole 71 is fixedly disposed an upwardly open cylindrical casing 72 which is closed at its bottom end. A piston 73 is vertically slidably inserted in casing 72. A piston rod 74 is fixed on a top surface of piston 73 and projects upwardly through the top opening of casing 72. A connection tab 75 is formed on the top end of piston rod 74. Connection tab 75 is provided with a slot 76 through which engaging pin 67 is disposed. Slot 76 is considerably elongated in perpendicular to piston rod 74 so as to secure a play for engaging pin 67.

Fluid is filled in casing 72 and sealed by a ring-shaped lid 77 plugging the top opening of casing 72. Piston rod 74 slidably penetrates lid 77. Lid 77 is provided therein with a packing which abuts against the outer peripheral surface of piston rod 74 so as to seal fluid while the sliding of piston rod 74.

Piston 73 is provided on its peripheral surface with a seal ring. An orifice is formed between the outer peripheral surface of the seal ring and the inner peripheral surface of casing 72 so as to allow the fluid to flow between the chambers of casing 72 above and below piston 73 while limiting the quantity thereof.

Due to the above-mentioned structure, by rotating connection arm 62 for operating movable swash plate 13, piston rod 74 connected with engaging pin 67 through connection tab 75 is pushed and pulled so as to displace piston 73 vertically. The fluid sealed in casing 72 as mentioned above flows through piston 73 while being limited in quantity, thereby generating a fluid-resistance against piston 73. Thus, the rotational motion of movable swash plate 13 becomes slow so as to prevent an operator from shocks in sudden shifting or braking of the vehicle.

The fluid is different (in quality) from the hydraulic oil for HST 8 filled in housing 9. Various kinds of fluid may be available for this fluid. In this embodiment, gear oil or turbine oil is sealed in casing 72, and diesel engine oil is filled outside casing 72 in housing 9.

If this fluid in casing 72 is more viscous than the hydraulic oil for HST 8, internal damper device 70 may be minimized and the orifice through piston 73 may be wider so as to prevent the blocking of dust therein while its effect of slowing movable swash plate 13 is sufficiently secured. Also, such viscous fluid makes the motion of movable swash plate 13 sufficiently slow even if the stroke of movable swash plate 13 is small.

Alternatively, the fluid may be less viscous than the hydraulic oil for HST 8. Generally, such fluid having small viscosity is temperature-resistant, thereby securing a constant operation of slowing movable swash plate 13 regardless of variation of surrounding temperature (particularly, regardless of the increase of temperature caused by driving of HST 8).

In vertical hole 71, casing 72 is provided on its outer periphery with a ring-shaped groove in which a retaining ring 78 is engaged. Vertical hole 71 is stepped so that its diameter above the step is larger than that below the step. Retaining ring 78 is put on a horizontal surface of the step of hole 71 and the outer periphery of retaining ring 78 abuts against the inner periphery of the upper portion of vertical hole 71, thereby fixing casing 72 along its proper vertical axis.

On the other hand, below vertical hole 71 (or center section 10), casing 72 is formed into a screw portion 79. A nut 80 is screwed around screw portion 79 so as to fasten casing 72 to center section 10, thereby fixing casing 72 in the vertical direction. If casing 72 is to be removed from center section 10 for its maintenance or the like, nut 80 is removed from screw portion 79.

Internal damper device 70 is a previously unified assembly as casing 72, which contains piston 73, the fluid and the like and is plugged by lid 77. This assembly is inserted into hole 71 and fixedly attached to center section 10, thereby completing the arrangement of internal damper device 70. This arrangement is easy and contributes for reducing processes in manufacturing axle driving apparatus 1. Also, internal damper device 70 is easily removed as a unit from center section 10, thereby facilitating its maintenance and adjustment.

A sponge 81 is disposed in the bottom portion of casing 72. The upper and lower chambers through piston 73 in casing 72 are volumetrically different from each other because piston rod 74 is extended from one side of piston 73. Sponge 81 is disposed oppositely to piston rod 74 with respect to piston 73, thereby equalizing the volumes of both chambers in casing 72.

Figure 6:
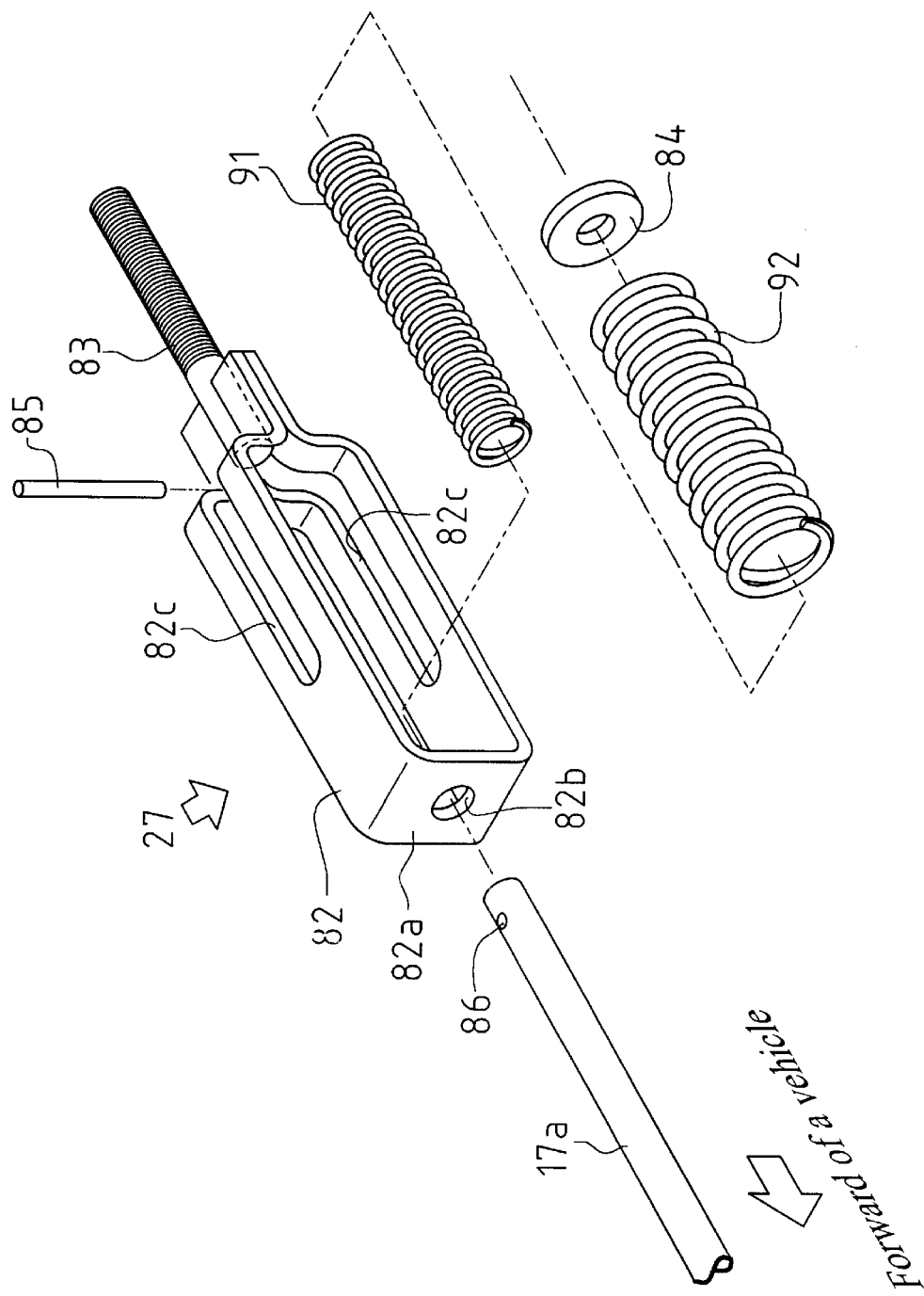
FIG. 6 is an exploded view in perspective of a spring joint during its assembly.

Description will now be given on spring joint 27 provided in the linkage interposed between speed control lever 61 and speed change pedal unit 26. As shown in FIG. 6, spring joint 27 comprises a hollow frame 82 and thread rod 83. Hollow frame 82 is formed by bending an elongated rectangular plate. Thread rod 83 is sandwiched by a rear end portion of hollow frame 82 and fixed to hollow frame 82 by welding. Rear connection rod 17b is screwed together with thread rod 83 so that rear connection rod 17b is extended backward from thread rod 83 while being adjustable in its backward extension.

A turning portion 82a of hollow frame 82 as a front end portion thereof is bored by a hole 82b. Front connection rod 17a is inserted into hollow frame 82 through hole 82b. In hollow frame 82, front connection rod 17a is doubly provided therearound with a pair of coiled first and second springs 91 and 92 and axially slidably provided therearound with a spring-retaining collar 84. Front connection rod 17a is diametrically bored through by a hole 86 through which a stopper pin 85 penetrates front connection rod 17a. Stopper pin 85 restricts the backward sliding of spring-retaining collar 84 along front connection rod 17a toward thread rod 83. Hollow frame 82 is formed at its end portion toward thread rod 83 (at its rear end portion) with upper and lower slots 82c. Both end portions of stopper pin 85 projecting from front connection rod 17a are slidably inserted into upper and lower slots 82c.

Figure 7:
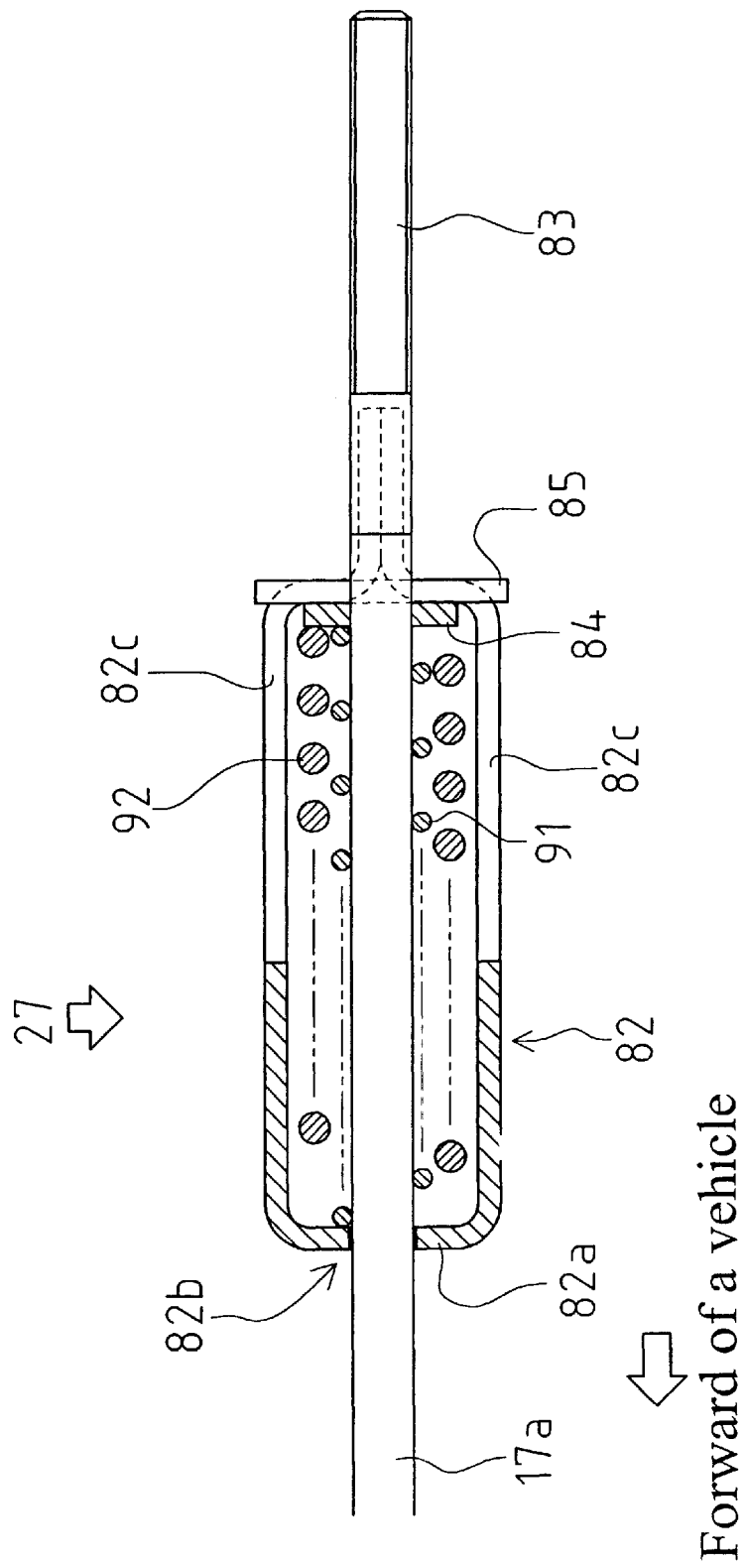
FIG. 7 is a sectional view of the same spring joint.

As shown in FIG. 7, first spring 91 which is diametrically smaller than second spring 92 abuts at its rear end against spring-retaining collar 84, and abuts at its front end against turning portion 82a of hollow frame 82. Due to this structure, when speed change pedal unit 26 is not operated, first spring 91 presses spring-retaining collar 84 against stopper pin 85 so that front connection rod 17a which is integral with spring-retaining collar 84 is pulled backward so as to abut at its rear end against a front end of thread rod 83. Thus, rear connection rod 17b is located so as to hold movable swash plate 13 in connection with rear connection rod 17b through speed control lever 61, speed control shaft 60 and connection arm 62 at its neutral position. At this time, hydraulic pump 11 does not discharge hydraulic oil, thereby keeping axles 50L and 50R at a standstill. Therefore, the vehicle is made stationary.

From this condition, if a front pedal 26a of speed change pedal unit 26 is depressed, front connection rod 17a in connection with front pedal 26a is pulled forward so as to move spring-retaining collar 84 forward. First spring 91 is compressed by spring-retaining collar 84 and pushes turning portion 82a of hollow frame 82 forward. Thus, rear connection rod 17b which is fixed to hollow frame 82 through thread rod 83 is pulled forward so as to rotate speed control lever 61 forward. Consequently, movable swash plate 13 is rotated from its neutral position so that hydraulic pump 11 discharges oil for driving rear axles 50L and 50R forwardly, thereby making the vehicle travel forward.

Even if front pedal 26a of speed change pedal unit 26 is depressed considerably suddenly, the reaction of speed control lever 61 to the depression of pedal 26a is delayed by spring joint 27, and also, movable swash plate 13 operationally follows speed control lever 61 through internal damper device 70. Therefore, the starting motion of movable swash plate 13 is moderated by synergy between the elastic action of spring joint 27 and the fluidal resistance of internal damper device 70 so that the vehicle can start without such a shock as to cause the head-rising of the vehicle, peculiar to a rear-wheel driving vehicle.

The initial length of second spring 92 around first spring 91 is shorter than that of first spring 91, more specifically, it is shorter than the distance between the front and rear ends of the hollow space of frame 82. Thus, when speed change pedal unit 26 is unpressed as shown in FIG. 7, neither spring-retaining collar 84 nor turning portion 82a of hollow frame 82 receives the spring force of second spring 92. However, when front pedal 26a of speed change pedal unit 26 is depressed beyond a certain stroke, spring-retaining collar 84 pulled forward approaches turning portion 82a of hollow frame 82 so that the distance between spring-retaining collar 84 and turning portion 82a becomes shorter than the initial length of second spring 92. Consequently, double forces of compressed first and second springs 91 and 92 are applied onto turning portion 82a.

Figure 8:
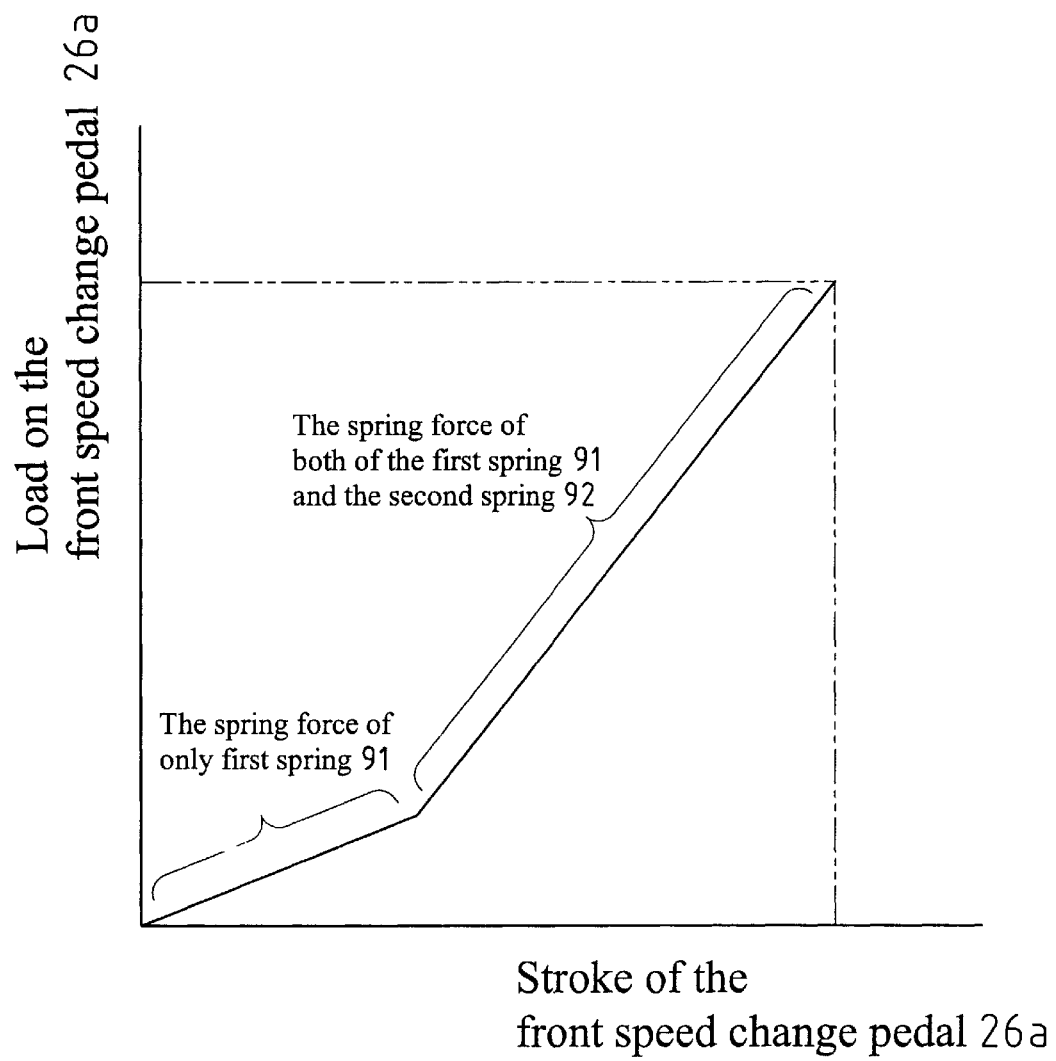
FIG. 8 is a graph of load on a speed control pedal in relative to the stroke of the pedal.

As is clear from a graph of FIG. 8, which illustrates load on front pedal 26a caused by spring joint 27 in relative to a stroke of pedal 26a, until the stroke of depressed pedal 26a reaches a length S, only the force of first spring 91 acts so that the load applied on speed change pedal unit 26 by spring joint 27 is gently increased in proportion to the stroke of pedal 26a. When pedal 26a is depressed over a stroke of length S, both the spring forces of first and second springs 91 and 92 act so that the ascent in load on pedal 26a becomes steep.

Due to such a structure, at the beginning of depressing front pedal 26a from the stationary condition of the vehicle, the force of spring joint 27 in pulling speed control lever 61 is weak because it is generated by only first spring 91. Therefore, the resistive action of internal damper device 70 is relatively strongly performed, thereby forcing movable swash plate 13 to move slowly so as to restrict the shock in starting of the vehicle. When front pedal 26a is depressed over stroke S so as to accelerate the vehicle, both springs 91 and 92 in spring joint 27 strongly pull speed control lever 61 so that movable swash plate 13 reacts immediately in response to depression of front pedal 26a regardless of internal damper device 70, thereby accelerating the vehicle desirably.

Incidentally, when rear pedal 26b of speed change pedal unit 26 is depressed for driving the vehicle backward, front connection rod 17a is pushed backward while its rear end abutting against the front end of thread rod 83, thereby rigidly pushing speed control lever 61 through thread rod 83 and rear connection rod 17b so as to rotate it backward. Thus, the elastic action of springs 91 and 92 in spring joint 27 does not effect to the backward operation of the vehicle. Mower tractor 20 in connection with this embodiment is a rear-wheel driving vehicle, which has the problem solved by the invention that, if front pedal 26a is depressed suddenly, the vehicle suddenly starts forward while its head possibly rises. However, even if rear pedal 26b is depressed suddenly, rear wheels 19 merely run idle while slipping so that the vehicle rarely start backward suddenly. Thus, spring joint 27 is structured on the basis of such a notion that it is enough if only the sudden starting in forward operation of the vehicle is prevented by the elastic action thereof.

The structure of spring joint 27 is not limited to the above-mentioned double spring structure. For example, double springs 91 and 92 may be replaced with a single spring such as a conically coiled spring or other various nonlinear springs, whose force is acceleratedly increased by being compressed over a certain displacement.

In this embodiment, the combination of spring joint 27 and internal damper device 70 serves as a resistive device for forcing movable swash plate 13 to move slowly. Even if only internal damper device 70 is used, the effect of restricting movable swash plate 13 in motion is secured. However, such a resistive device as a combination of spring joint 27 and internal damper device 70 is more desirable because it is rationally effective in both prevention of shock in starting and respondency of acceleration to accelerating operation.

Figure 9:
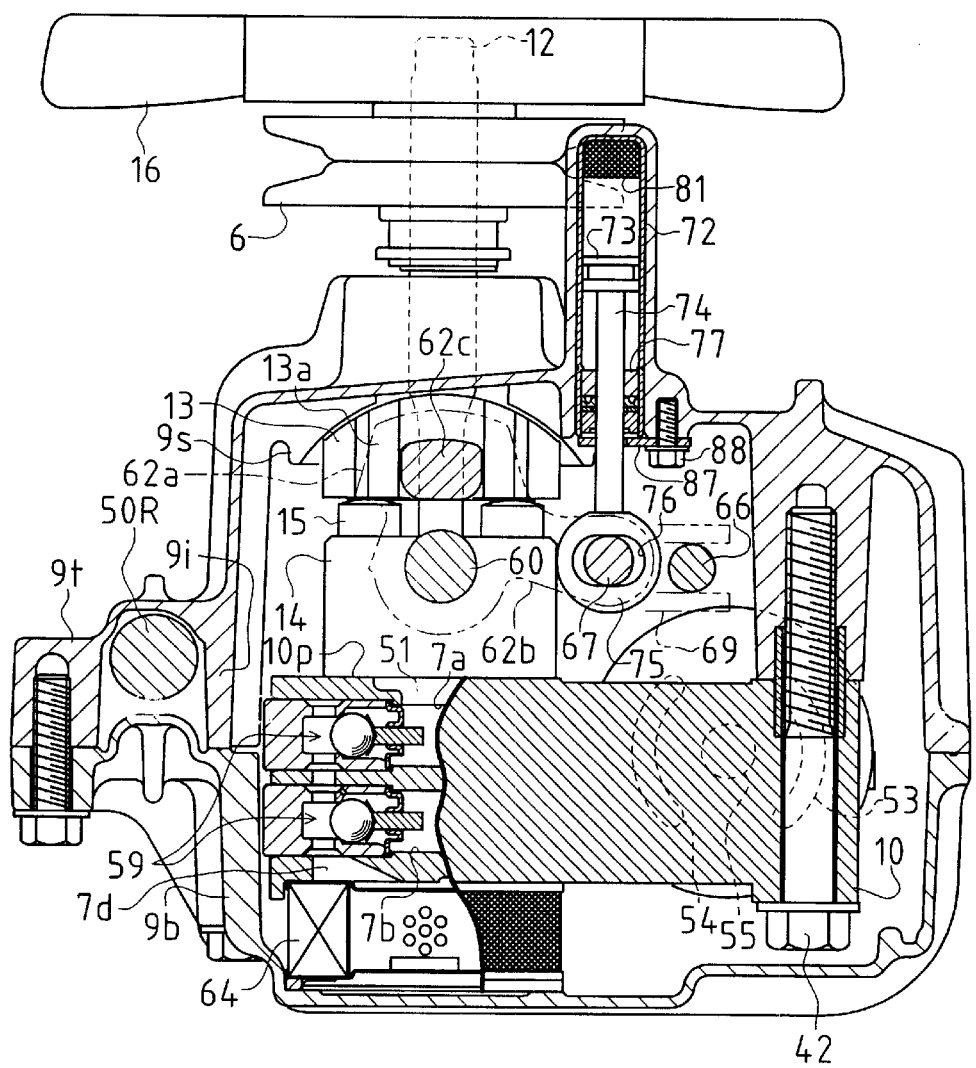
FIG. 9 is a cross sectional view taken on line A—A of FIG. 2 showing an internal damper according to a second embodiment of the present invention.

A second embodiment of internal damper device 70 will be described in accordance with FIG. 9. A part of the ceiling wall of upper housing part 9t projects upwardly so as to form therein with a recessed portion (hole) 9r which is downwardly open. Internal damper device 70 is fitted into recessed portion 9r. This internal damper device 70 is substantially similar with that of the first embodiment as shown in FIG. 4. The different points are that this internal damper device 70 is vertically reversed, that recessed portion 9r in which internal damper device 70 is disposed is not formed of center section 10 but formed of upper housing part 9t, that a screw like the above-mentioned screw 79 is not formed on the periphery of casing 72, and that a discoid retaining member 87 to which internal damper device 70 in recessed portion 9r is fixed replaces retaining ring 78 and nut 80.

Piston rod 74 is extended downwardly from piston 73 so as to project downwardly from casing 72 and retaining member 87. The bottom end of piston rod 74 is formed into connection tab 75 having slot 76. Engaging pin 67 is inserted through slot 76. The position of cooling fan 16 fixed onto input shaft 12 is located higher than that shown in FIG. 4, thereby being prevented from interfering with upward projecting recessed portion 9r of upper housing part 9t.

In the second embodiment, internal damper device 70 comprising casing 72, piston 73, piston rod 74, lid 77, fluid sealed in casing 72 and sponge 81 is also a previously assembled unit. At the site of assembling axle driving apparatus 1, internal damper device 70 as a unit is fitted into recessed portion 9r of upper housing part 9t and fixed thereto together with retaining member 87 through bolts 88. Internal damper device 70 can be removed from recessed portion 9r by screwing out bolts 88 and removing retaining member 87 from upper housing part 9t, thereby facilitating maintenance.

Figure 10:
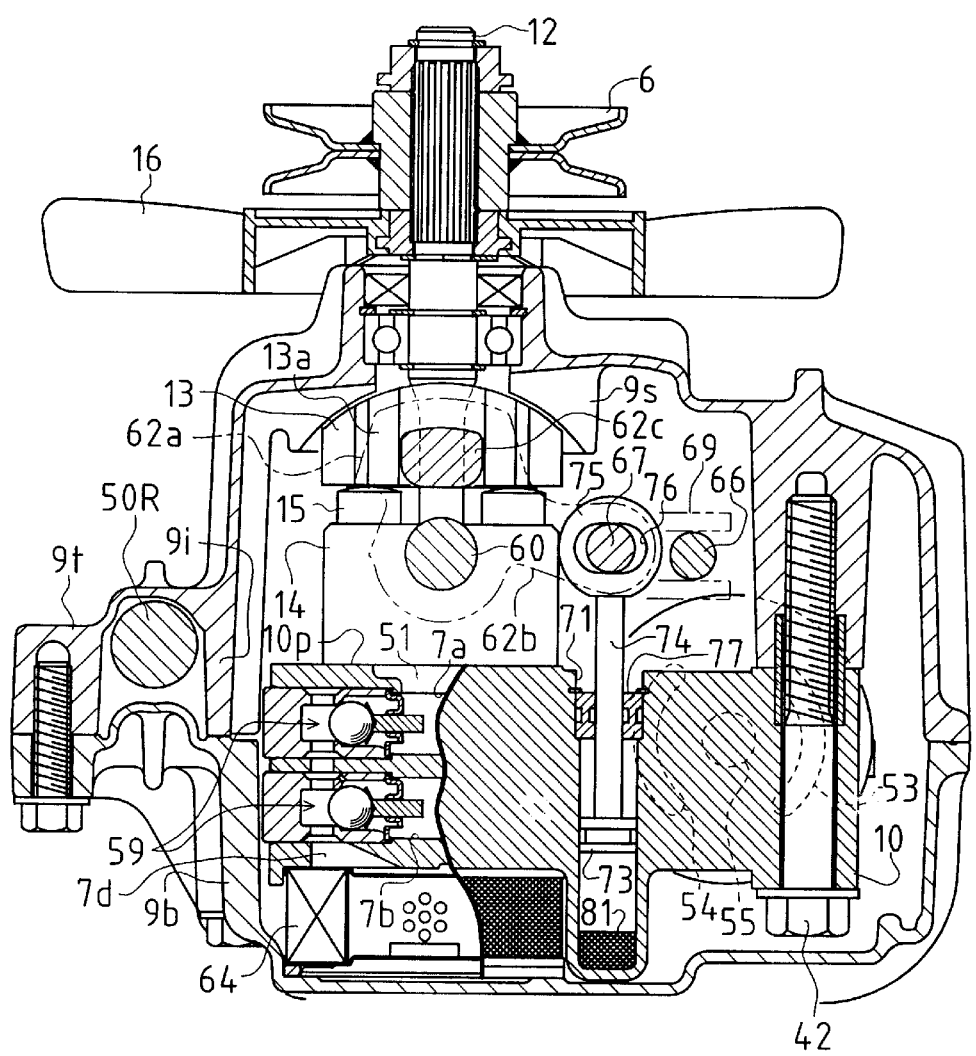
FIG. 10 is a cross sectional view taken on line A—A of FIG. 2 showing an internal damper according to a third embodiment of the present invention.

A third embodiment of internal damper device 70 will be described in accordance with FIG. 10. Similarly with the first embodiment, internal damper device 70 is structured in center section 10. However, a vertical hole 71 is further downwardly extended and closed below the bottom surface of center section 10, thereby being formed as a downwardly projecting recessed portion. Piston 73, the fluid, sponge 81 and the like are directly disposed in hole 71 without casing 72. The open top end of hole 71 is covered with a ring-shaped lid 77. Other parts and structure are similar with those of the first embodiment.

Figure 11:
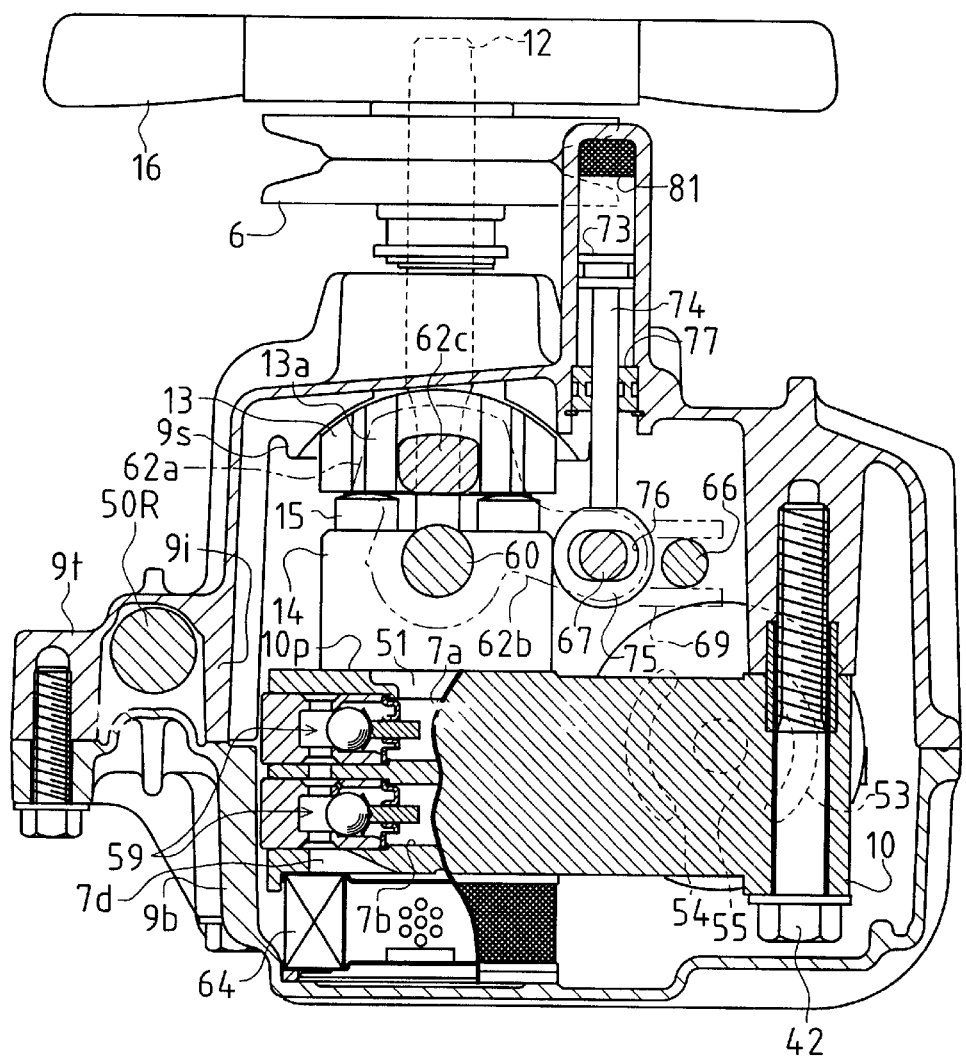
FIG. 11 is a cross sectional view taken on line A—A of FIG. 2 showing an internal damper according to a fourth embodiment of the present invention.

A fourth embodiment of internal damper device 70 will be described in accordance with FIG. 11. Similarly with the second embodiment, internal damper device 70 is structured in upper housing part 9t. However, piston 73, sponge 81 and lid 77 are directly disposed in recessed portion (hole) 9r formed of the ceiling wall of upper housing part 9t and the fluid is sealed therein without casing 72, engaging member 87 and so on. Other parts and structure are similar with those of the second embodiment.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An operation mechanism for a variable displacement hydraulic pump, comprising:
  a housing filled with first fluid;
  a variable displacement hydraulic pump disposed in said housing;
  a capacity regulating member provided on said hydraulic pump in said housing for changing the discharge amount of said hydraulic pump;
  an operation member operationally connected to said capacity regulating member, said operation member being manipulated outside said housing;
  a resistive device interposed between said operation member and said capacity regulating member for making the motion of said capacity regulating member slow, said resistive device being an assembly unit comprising
    a casing,
    a piston slidably disposed in said casing, and
    second fluid sealed in said casing, said second fluid being different from said first fluid;
  a hole provided in said housing, wherein said casing is fitted into said hole; and
  a retaining member provided in said housing, wherein said retaining member retains said casing in said hole.

2. The operation mechanism for a variable displacement hydraulic pump as set forth in claim 1, further comprising:
a center section disposed in said housing, said hydraulic pump being mounted onto said center section, wherein said hole is formed by said center section.

3. The operation mechanism for a variable displacement hydraulic pump as set forth in claim 1, wherein said hole is formed by a wall of said housing.

4. The operation mechanism for a variable displacement hydraulic pump as set forth in claim 1, wherein said hole is defined in said housing.

5. An operation mechanism for a variable displacement hydraulic pump, comprising:
a housing filled with first fluid;
a center section disposed in said housing;
a variable displacement hydraulic pump mounted on said center section in said housing;
a capacity regulating member provided on said hydraulic pump in said housing for changing the discharge amount of said hydraulic pump;
an operation member operationally connected to said capacity regulating member, said operation member being manipulated outside said housing; and
a resistive device interposed between said operation member and said capacity regulating member for making the motion of said capacity regulating member slow, said resistive device comprising
a hole formed by said center section,
a piston slidably disposed in said hole, and
second fluid sealed in said hole, said second fluid being different from said first fluid.

6. The operation mechanism for a variable displacement hydraulic pump as set forth in claim 5, wherein said second fluid is more viscous than said first fluid.

7. The operation mechanism for a variable displacement hydraulic pump as set forth in claim 5, wherein said second fluid is less viscous than said first fluid.

8. The operation mechanism for a variable displacement hydraulic pump as set forth in claim 5, wherein said resistive device further comprises a casing in which said piston and said second fluid are disposed, and wherein said casing is removably fitted in said hole.

9. An operation mechanism for a variable displacement hydraulic pump, comprising:
a housing filled with first fluid;
a center section disposed in said housing;
a variable displacement hydraulic pump mounted on said center section in said housing;
a capacity regulating member provided on said hydraulic pump in said housing for changing the discharge amount of said hydraulic pump;
an operation member operationally connected to said capacity regulating member, said operation member being manipulated outside said housing; and
a resistive device interposed between said operation member and said capacity regulating member for making the motion of said capacity regulating member slow, said resistive device comprising
a hole formed by a wall of said housing,
a piston slidably disposed in said casing, and
second fluid sealed in said casing, said second fluid being different from said first fluid.

10. The operation mechanism for a variable displacement hydraulic pump as set forth in claim 9, wherein said second fluid is more viscous than said first fluid.

11. The operation mechanism for a variable displacement hydraulic pump as set forth in claim 9, wherein said second fluid is less viscous than said first fluid.

12. The operation mechanism for a variable displacement hydraulic pump as set forth in claim 9, wherein said resistive device further comprises a casing in which said piston and said second fluid are disposed, and wherein said casing is removably fitted in said hole.

13. An operation mechanism for a variable displacement hydraulic pump, comprising:
a housing filled with first fluid;
a variable displacement hydraulic pump disposed in said housing;
a capacity regulating member provided on said hydraulic pump in said housing for changing the discharge amount of said hydraulic pump;
an operation member operationally connected to said capacity regulating member, said operation member being manipulated outside said housing;
a pair of first and second resistive devices interposed between said operation member and said capacity regulating member for making the motion of said capacity regulating member slow;
wherein said first resistive device, which is fluidly actuated, is disposed in said housing, and
wherein said second resistive device, which includes a spring, is disposed outside said housing and interposed in a linkage between said operation member and said first resistive device.

14. The operation mechanism for a variable displacement hydraulic pump as set forth in claim 13, wherein biasing force of said second resistive device against manipulation force applied on said operation member is increased as the operational degree of said operation member is increased, and wherein said biasing force is acceleratedly increased when said operational degree is over a certain degree.

15. The operation mechanism for a variable displacement hydraulic pump as set forth in claim 14, wherein said second resistive device comprises:
a diametrically larger coiled spring; and
a diametrically smaller coiled spring, wherein said two springs are doubly disposed, and wherein one of said two springs are initially longer than the other.

16. An operation mechanism for a variable displacement hydraulic pump, comprising:
a housing filled with first fluid;
a variable displacement hydraulic pump disposed in said housing;
a capacity regulating member provided on said hydraulic pump in said housing for changing the discharge amount of said hydraulic pump;
an operation member operationally connected to said capacity regulating member, said operation member being manipulated outside said housing;
a hydraulic motor fluidly connected with said hydraulic pump for driving an axle; and
a resistive device, which includes a spring, interposed in a linkage between said operation member and said capacity regulating member for making the motion of said capacity regulating member slow, wherein biasing force of said resistive device against manipulation force applied on said operation member is increased as the operational degree of said operation member is increased, and wherein said biasing force is acceleratedly increased when said operational degree is over a certain degree.

17. The operation mechanism for a variable displacement hydraulic pump as set forth in claim 16, wherein said resistive device comprises:

a diametrically larger coiled spring; and a diametrically smaller coiled spring, wherein said two springs are doubly disposed, and wherein one of said two springs are initially longer than the other.

18. An operation mechanism for a variable displacement hydraulic pump, comprising:

a housing filled with first fluid;

a variable displacement hydraulic pump disposed in said housing;

a capacity regulating member provided on said hydraulic pump in said housing for changing the discharge amount of said hydraulic pump;

an operation member operationally connected to said capacity regulating member, said operation member being manipulated outside said housing; and a resistive device interposed between said operation member and said capacity regulating member for making the motion of said capacity regulating member slow, wherein said resistive device is disposed in said housing and fluidly actuated by a second fluid which is different from said first fluid.

* * * * *

UNITED STATES PATENT AND TRADEMARK OFFICE
Certificate

Patent No. 6,536,212 B1                                                Patented: March 25, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Koji Irikura, Hyogo, Japan; Mike Chisman, Morristown, TN (US); and Hideaki Okada, Hyogo, Japan Signed and Sealed this Twenty-fourth Day of October 2006.

EDWARD LOOK
*Supervisory Patent Examiner*
Art Unit 3745